United States Patent [19]

Coursen

[11] Patent Number: 4,462,429
[45] Date of Patent: Jul. 31, 1984

[54] APPARATUS AND METHOD FOR TRANSFERRING A BINGHAM SOLID THROUGH A LONG CONDUIT

[75] Inventor: David L. Coursen, Mercersburg, Pa.

[73] Assignee: E. I. Du Pont de Nemours and Company, Wilmington, Del.

[21] Appl. No.: 375,543

[22] Filed: May 6, 1982

[51] Int. Cl.³ ............................................... F17D 1/16
[52] U.S. Cl. ...................................... 137/891; 137/13
[58] Field of Search ................................. 137/13, 891

[56] References Cited

U.S. PATENT DOCUMENTS

| 2,821,205 | 1/1958 | Chilton et al. |
| 3,257,180 | 6/1966 | King ....................... 137/891 X |
| 3,414,004 | 12/1968 | Bankston . |
| 3,643,688 | 2/1972 | Meinert .................. 137/891 X |
| 3,826,279 | 7/1974 | Verschuur . |
| 3,886,972 | 6/1975 | Scott et al. |
| 4,259,977 | 4/1981 | Brockington . |
| 4,273,147 | 6/1981 | Olney . |

*Primary Examiner*—Alan Cohan

[57] ABSTRACT

An apparatus for injecting a lubricating liquid, e.g., water, into a conduit as an annular layer around a flowing Bingham solid, e.g., a water gel or water-in-oil emulsion explosive, to facilitate the flow of the Bingham solid has an annular passageway from which the lubricating liquid flows into a cylindrical chamber containing the flowing Bingham solid. The annular passageway has a constricted throat portion of adjustable width, which, along with the flow rates of the Bingham solid and the lubricating liquid, is adjusted to produce a thin film of lubricant which allows lubricated plug flow of the Bingham solid in a descending section of conduit under the propelling force of gravity alone. Low drag permits the delivery of Bingham solid explosives into very deep vertical holes with no increase in the required pumping pressure.

7 Claims, 3 Drawing Figures

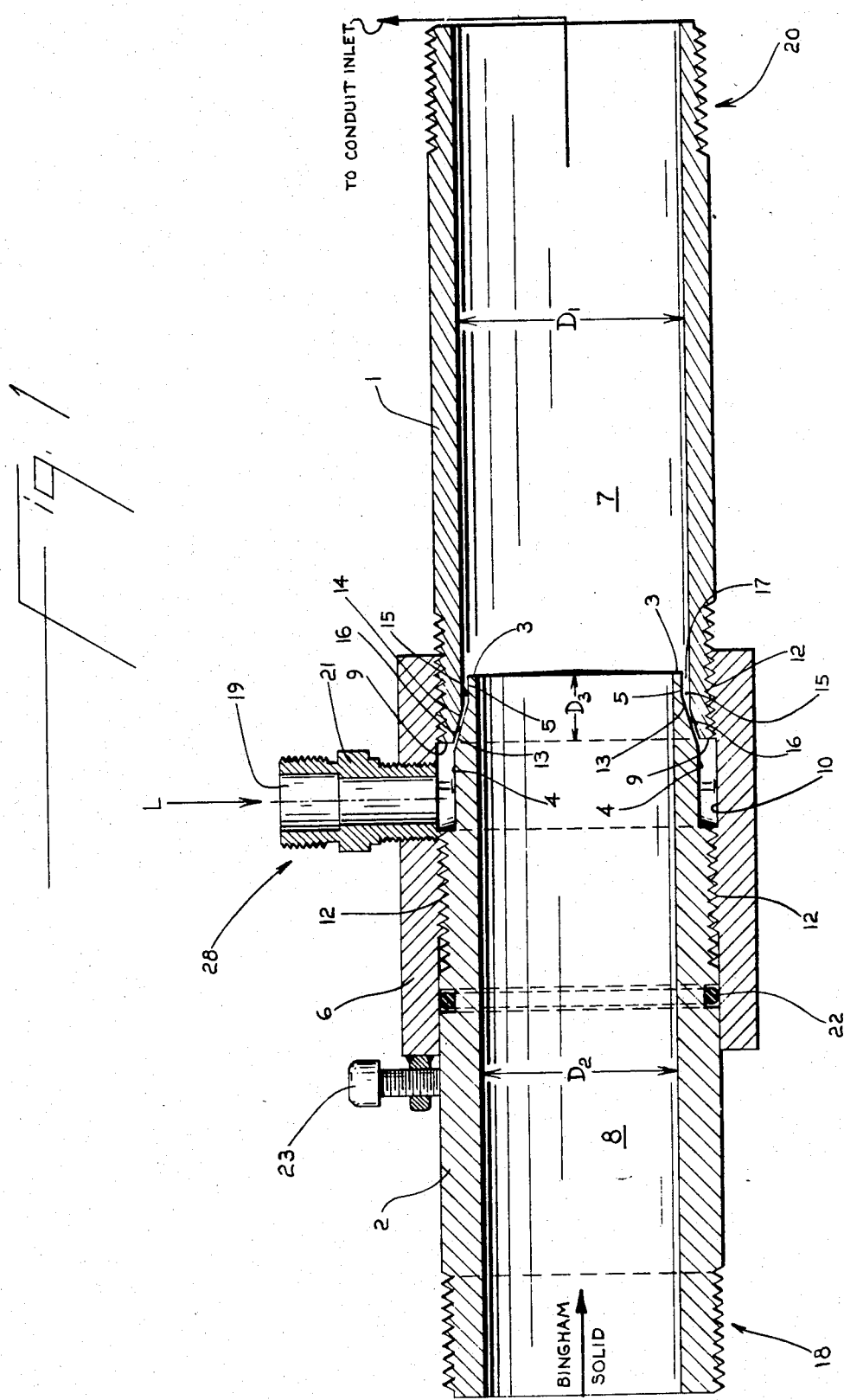

B = STREAMLINES OF BINGHAM SOLID

L = STREAMLINES OF LUBRICANT

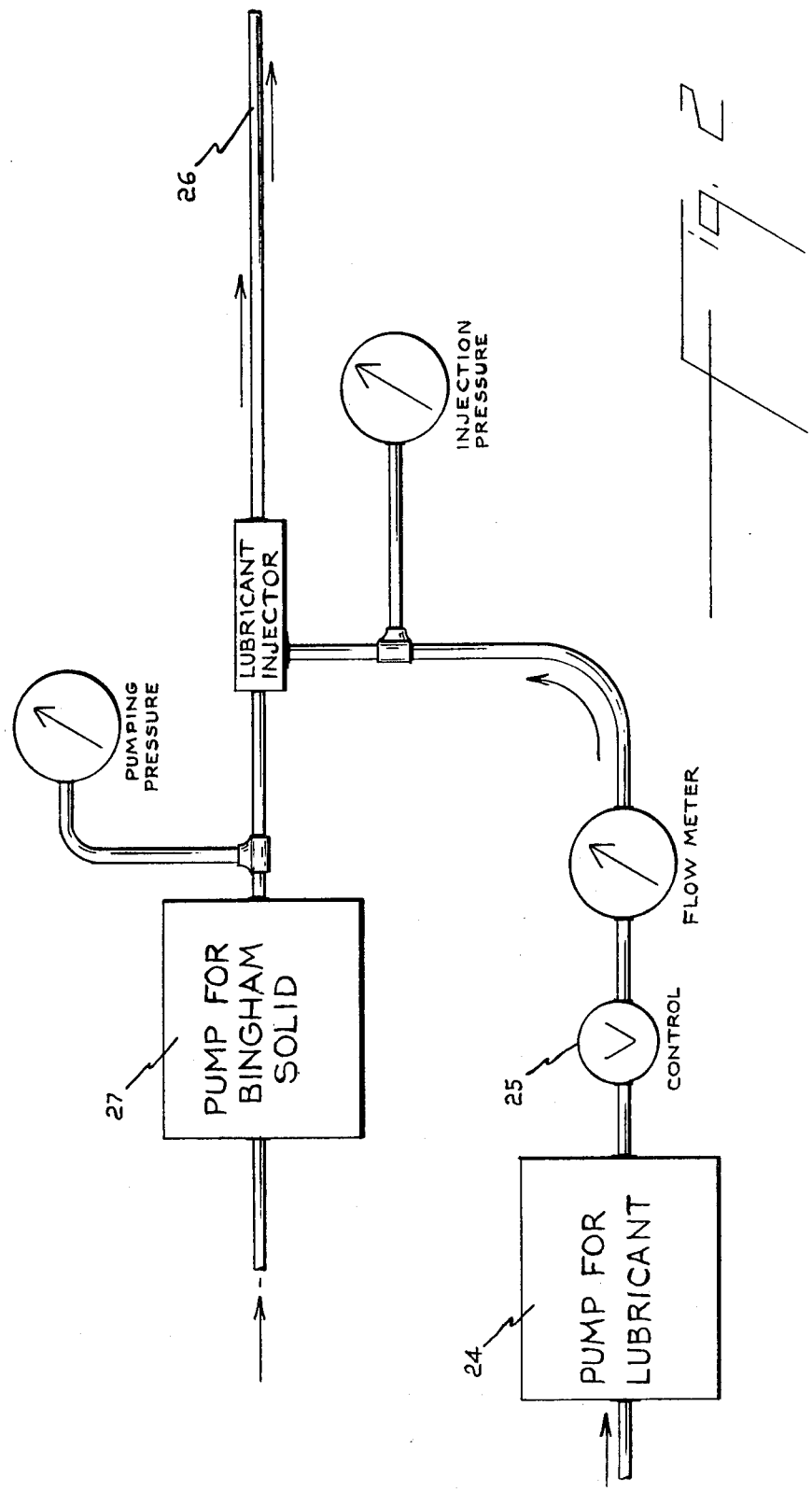

APPARATUS AND METHOD FOR TRANSFERRING A BINGHAM SOLID THROUGH A LONG CONDUIT

BACKGROUND OF THE INVENTION

1. Field of the Invention

The present invention relates to an apparatus for aiding in the transfer of a Bingham solid, e.g., an aqueous explosive composition of the water gel or water-in-oil emulsion type, or an aqueous composition useful for stimulating wells by the hydraulic fracturing method, through a long conduit, i.e., a pipe or hose, and to a method of using the apparatus.

2. Description of the Prior Art

A body of prior art exists on apparatuses which inject lubricating liquids of lower viscosity into conduits carrying liquids of higher viscosity, e.g., petroleum oils, to reduce the pressure drop therein. In this art, the liquid of lower viscosity is injected into the conduit by any of a number of devices so as to form an annular layer between the inner wall of the conduit and the liquid of higher viscosity flowing through the conduit. U.S. Pat. Nos. 2,821,205 (E. G. Chilton et al.) and 3,414,004 (Bankston) are examples of this art.

A smaller body of prior art deals with similar devices for reducing the pressure drop in conduits carrying Bingham solids in plug flow, or materials that, depending on the temperature, are viscous liquids or Bingham solids. U.S. Pat. Nos. 3,886,972 (P. R. Scott et al.), 3,826,279 (E. Verschuur), 4,273,147 (R. S. Olney), and 4,259,977 (J. W. Brockington) typify this art, the latter two patents dealing with the transportation and placement of Bingham solids that are emulsion explosives.

The term "Bingham solid" as used herein to refer to the material to be moved through the long conduit, denotes a substance of gelatinous, plastic, or semisolid consistency that will flow without delay only after having had imposed on it a shear stress that exceeds some finite critical value. Solids which have this property nevertheless may deform gradually over a period of time under stresses that are much lower than this critical stress for flow without delay.

In an application such as that in which a Bingham solid is delivered down a deep oil or gas well to extend and prop a hydraulic fracture in the producing formation and thereby stimulate production from the well, the best results are obtained with the very high delivery rates that can be achieved most easily if the pressure drop in the conduit is very low. Such Bingham solids can be, for example, gelled water containing suspended particles of hard materials (e.g., sand, sintered bauxite, or walnut shells) having sufficient strength to prevent complete closure of a hydraulic fracture if distributed in the fracture.

Where the material being delivered through the conduit is a Bingham solid, the pressure drop is most effectively reduced if the annulus of liquid injected into the conduit provides sufficient lubrication to permit the column of Bingham solid to slide through the conduit without undergoing appreciable deformation in shear, that is, if it moves in what is known as "plug flow". In applications where the Bingham solid is to be transferred downward through a descending section of conduit via such lubricated plug flow, it is particularly advantageous if the plug flow in the descending section can occur under the propelling force of gravity alone. The low drag required to obtain plug flow under gravity alone is also advantageous in conduits having no descending section.

In some applications, where the lubricant is immiscible with the Bingham solid, it is possible to use copious amounts of the lubricant and recover most of it by skimming it off on the downstream end of the conduit. In some other applications, where the lubricant is miscible with the Bingham solid, eventual dilution of the product with lubricant has no serious consequences. But when the Bingham solid is an explosive being delivered into a borehole or well, it is not feasible to skim off the lubricant and it is particularly important to use as little lubricant as possible in order to maintain the effective strength and sensitivity of the explosive. The spray ring apparatus used in the method of the aforementioned U.S. Pat. No. 4,259,977, which represents the state of the prior art in this regard, is disclosed as being used most effectively with a lubricating fluid flow rate which is from about 3% to about 5% of the flow rate of the explosive, on a weight basis. In the lubricant injectors described in the aforementioned patents, the annular passageway through which the lubricant flows has a fixed cross-section, which precludes convenient adjustment of the lubricant flow conditions within the injector itself.

Furthermore, the lubricant injectors described in the aforementioned patents do not, in general, permit a Bingham solid to slide through a descending conduit on an annulus of lubricating fluid under the influence of gravity alone, an important advantage if the Bingham solid is being delivered down a deep hole. For example, the aforementioned U.S. Pat. No. 4,273,147 (Olney) describes an experiment in which an emulsion of density 1.25 was pumped through a 25.4 mm hose at a rate of 27 liters per minute, using the lubricant injector described in that patent. The resulting pressure drop was about 15.8 kPa per meter. Since gravity could have produced a pressure drop of only 12.3 kPa per meter, the device of Olney would not have permitted his Bingham solid to slide through his hose at the stated rate under the influence of gravity alone, nor is there any reason to believe that it could have moved through the hose at all under the influence of gravity alone.

A lubricant injector whose use would permit a Bingham solid to slide through a descending conduit on an annulus of lubricating fluid under the influence of gravity alone would permit Bingham solid to be delivered through a descending conduit of very great additional length with no additional pumping pressure. In some circumstances, where the descending conduit is at the outlet of a hopper, no pumping pressure at all would be required.

SUMMARY OF THE INVENTION

The apparatus of the present invention is a lubricant injector incorporating a combination of design features which result in greater effectiveness when used with less lubricant in the pumping of Bingham solids that are explosives than is reported to have been achieved with injectors of the prior art. In contrast to the lubricant injector described in the aforementioned U.S. Pat. No. 4,259,977, for example, the present apparatus allows lubricated plug flow downward in a descending section of conduit under the propelling force of gravity alone when the flow rate of lubricant is no greater than 0.33% of the flow rate of explosive, on a weight basis. Such low drag permits the delivery of such explosives through unusually long conduits, and also permits the delivery of such explosives into very deep vertical holes with no increase in the required pumping pressure. Also, this ten-fold or more reduction in the amount of lubricant used with Bingham solid explosives assures better control of the strength and sensitivity of the explosive owing to the decreased risk of dilution. Moreover, as will be described more fully hereinafter, the adjustability of the cross-section of the annular passageway through which the lubricant flows allows convenient adjustment of the flow conditions of the lubricant, including the formation of a favorable annular vortex flow configuration in the lubricant at the exit portion of the annular passageway.

The present invention provides an apparatus for aiding in the transfer of a Bingham solid by lubricated plug flow through a conduit comprising:

(a) a first cylinder open at both ends and having a substantially uniform internal diameter;

(b) a second cylinder open at both ends and having a substantially uniform internal diameter which is less than the internal diameter of the first cylinder, the outer surface of the second cylinder being stepped down at one end in a manner such that (1) an initial stepdown portion has a diameter which is less than the outer diameter, and greater than the internal diameter, of the first cylinder, and (2) a terminal stepdown portion, adjacent a blunt or squared-off end surface of the second cylinder, has a diameter which is substantially uniform and less than the internal diameter of the first cylinder; and (c) a third cylinder open at both ends and fitted over, and in fluid-tight, axially rigid, coupling engagement with, overlapping ends of the first and second cylinders, the first and second cylinders being positioned coaxially with respect to one another in a manner such that the blunt end surface adjacent the terminal stepdown portion of the outer surface of the second cylinder is inside the first cylinder, thereby forming coaxial, communicating, first and second cylindrical chambers delimited by the plane which passes through the blunt end surface of the second cylinder, said initial stepdown portion of the outer surface of the second cylinder, the end surface of the first cylinder adjacent thereto, and a portion of the inside surface of the third cylinder together forming an annular (lubricant inlet) chamber coaxial with the first (downstream) and second (upstream) cylindrical chambers, the relative displacement of the first and second cylinders along their common axis being adjustable, preferably by threaded engagement, at their coupling with the third cylinder, thereby allowing the annular chamber to be (1) closed to the cylindrical chambers whereby a portion of a surface between the initial and terminal stepdown portions of the outer surface of the second cylinder is in contact with a conforming portion of a facing surface at the end of the first cylinder, or (2) open as a result of the separation of the conforming surface portions, this separation forming an annular passageway connecting the annular chamber with the first cylindrical chamber, the annular passageway having a constricted throat portion and a wider exit portion that is coaxial with, and ends in the plane which delimits, the cylindrical chambers, the distal end of the second cylinder being adapted to connect with a source of Bingham solid, the wall of the third cylinder containing a passageway from its outer surface to the annular chamber adapted to connect with a source of lubricating liquid, and the distal end of the first cylinder being adapted to connect with a conduit for receiving Bingham solid and lubricating liquid exiting from the first cylindrical chamber.

The above-mentioned adjustability of the flow conditions of the lubricant arises from the adjustability of the first and second cylinders along their common axis, allowing the closure and opening of the constricted throat portion of the annular passageway connecting the annular chamber with the downstream cylindrical chamber.

The method of the present invention comprises (a) exerting a pressure on a Bingham solid to force it axially through an upstream cylindrical chamber having a substantially uniform diameter, from which the Bingham solid moves axially into and through an adjoining downstream cylindrical chamber having a substantially uniform diameter larger than that of the upstream chamber, and from which it then moves into and through a conduit of substantially uniform diameter substantially equal to that of the downstream cylindrical chamber; and (b) simultaneously injecting a lubricating fluid into an annular chamber coaxial with the cylindrical chambers, the annular chamber being adapted to be connected to the downstream chamber by an annular passageway coaxial with the cylindrical chambers, the annular passageway having a constricted annular throat portion of adjustable width and a wider annular exit portion that ends facing in the downstream direction in a plane that delimits the cylindrical chambers and is normal to their common axis, the annular exit portion having an outside diameter substantially equal to the diameter of the downstream chamber and an inside diameter substantially greater than the diameter of the upstream chamber;

(1) the rate at which the Bingham solid is forced through the chambers and conduit, (2) the rate of injection of the lubricating fluid, and (3) the width of the constricted annular throat being selected to give a lubricating fluid flow rate which is no greater than about 5% of the Bingham solid flow rate, on a weight basis, and a drag force on the Bingham solid moving through a given section of the conduit which is no greater than the motive force of gravity on the Bingham solid when the given section of conduit is made vertical.

BRIEF DESCRIPTION OF THE DRAWING

In the accompanying drawing, which illustrates specific embodiments of the apparatus and method of the invention, FIG. 1 is a cross-sectional view of the lubricant injector for attachment to a source of a Bingham solid, a source of a lubricating liquid, and a conduit, e.g., a pipe or hose;

FIG. 2 is a diagram of the pumped flow of a Bingham solid and a lubricant to a conduit through the injector of the invention.

DETAILED DESCRIPTION

Figure 1A:
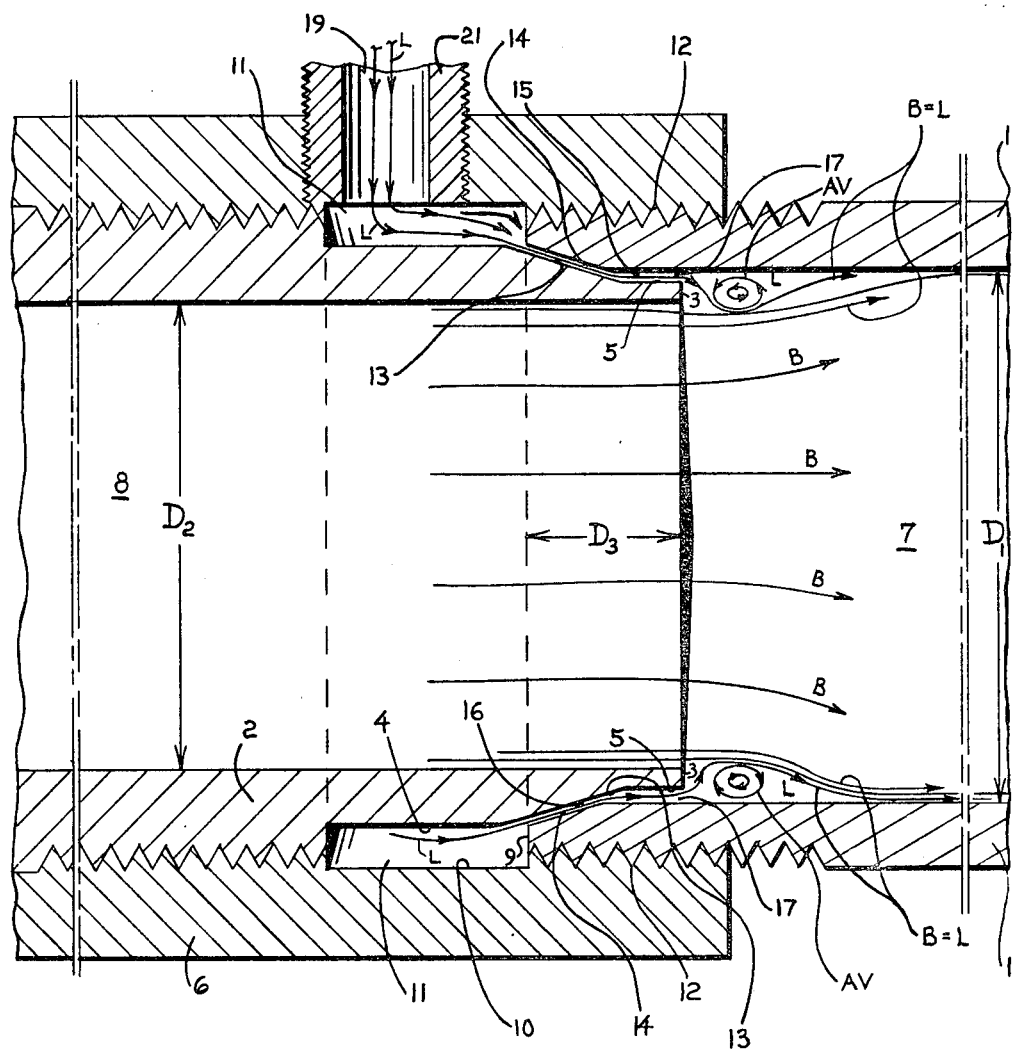
FIG. 1A is a portion of the injector shown in FIG. 1 magnified to reveal more clearly the annular passageway for the lubricant, and showing the lubricant and Bingham solid flow lines.

In the lubricant injector of the invention shown in FIGS. 1 and 1A, two cylinders are joined together by means of a coupling cylinder or sleeve to form two coaxial cylindrical chambers to carry the pumped flow of a Bingham solid, e.g., a water gel or water-in-oil emulsion blasting agent, one of the chambers being upstream, and the other downstream, from an annular passageway for injecting a lubricant, e.g., water, into the larger-diameter downstream chamber around the flowing Bingham solid. In FIGS. 1 and 1A, 1 is a first cylinder or pipe, and 2 a second cylinder or pipe, each being open at both ends and each having a substantially uniform internal diameter, the internal diameter ($D_2$) of cylinder 2 being less than that ($D_1$) of cylinder 1. At one end, the outer surface of cylinder 2 is stepped down (reduced in diameter) so as to form an initial stepdown portion 4 and a terminal stepdown portion 5. Portion 5 has a substantially uniform diameter which is less than $D_1$, and is adjacent the end surface 3 of cylinder 2, which is blunt or squared-off. The diameter of portion 4 is less than the outer diameter of cylinder 1 and greater than $D_1$.

Cylinder 1 is threaded externally at both ends, and cylinder 2 at one end and in a section adjacent initial stepdown portion 4. The third cylinder 6 also is open at both ends, and has first and second threaded sections on its inside wall separated by an unthreaded surface 10. The first threaded section of cylinder 6 is at one end and engages the threads at one end of cylinder 1; the second threaded section is intermediate the ends of cylinder 6 and engages the threads on cylinder 2 adjacent initial stepdown portion 4, the three cylinders 1, 2, and 6 being threadedly engaged coaxially at threaded coupling 12. Blunt end surface 3 of cylinder 2, adjacent terminal stepdown portion 5, is inside cylinder 1, thereby forming two coaxial, communicating, cylindrical chambers, i.e., a downstream chamber 7 and an upstream chamber 8, the boundary between the upstream and downstream chambers being the plane passing through end surface 3 normal to the common axis of the cylindrical chambers.

An annular chamber 11, which is coaxial with chambers 7 and 8, is formed by the initial stepdown portion 4 of the outer surface of cylinder 2, end surface 9 of cylinder 1, and inside surface 10 of cylinder 6. Threaded coupling 12 allows the relative displacement of cylinders 1 and 2 (i.e., the distance $D_3$ between end surface 9 of cylinder 1 and end surface 3 of cylinder 2) to be changed. This, in turn, allows annular chamber 11 to be open (as shown) or closed to chambers 7 and 8. In the closed position, a portion of a slanted surface 13 between stepdown portions 4 and 5 of cylinder 2 is in contact with a conforming portion of a facing surface 14 at the end of cylinder 1. In an open position, the conforming surface portions are separated so as to form an annular passageway 15 having a constricted throat portion 16 and a wider exit portion 17, the latter being coaxial with, and ending in the plane which delimits, chambers 7 and 8. Thus, the opening or size of throat portion 16 is adjustable by axial movement of upstream chamber 8 relative to downstream chamber 7 (i.e., axial movement of cylinder 2 relative to cylinder 1) by rotating cylinder 2 on threads 12.

Lubricant inlet tube 21 threadedly engages cylinder 6 in an aperture which penetrates through the wall of cylinder 6 adjacent chamber 11. The bore of tube 21 communicates with annular chamber 11 and forms a passageway or inlet 19 thereto. Lubricant can be pumped through passageway 19 into chamber 11, from where it can flow through throat portion 16 of annular passageway 15. Chamber 11 allows a circumferentially uniform flow of lubricant through passageway 15.

O-ring seal 22 prevents loss of lubricant through threads 12, and set screw 23 holds the desired setting for the width of throat portion 16. The outer surfaces of cylinders 2 and 6 can contain fiducial marks to indicate the setting of the width of throat portion 16. An outside surface also can be marked to indicate the proper flow direction, i.e., from chamber 8 to chamber 7.

Distal end 18 of cylinder 2 is threaded on its outside surface and is thereby adapted to be connected to a source (e.g., a mixer or tank) of a Bingham solid. Distal end 20 of cylinder 1 also is threaded on its outside surface and is thereby adapted to be connected to the inlet of a conduit. The distal end 28 of tube 21 is threaded on its outside surface and is thereby adapted to be connected to a source of lubricating liquid.

As is shown in FIG. 2, lubricant is pumped into the injector (through passageway 19) by a lubricant pump 24, under a pressure, or at a rate, controllable partly through regulation of either the energy supplied to the pump or of a control valve 25 in the lubricant line, and partly through regulation of the width of throat portion 16 of annular passageway 15 in the lubricant injector.

The optimum settings for the width of throat portion 16 and control valve 25 generally will be those that result in a satisfactorily high rate of flow for the Bingham solid through the lubricant injector and the conduit 26, with the lowest rate of lubricant flow, under conditions of either (a) a satisfactorily low steady-state pumping pressure by the pump 27 for the Bingham solid, (b) a satisfactorily low intermittent pumping pressure by pump 27 when conduit 26 is full, or (c) flow under the influence of gravity alone. These settings will generally depend to some extent on the compositions of the Bingham solid and the lubricant, the operating characteristics of their pumps, the diameter and length of the conduit and its elevation along its length, the external hydrostatic pressure at its exit, and the temperature.

Generally, settings that give satisfactory performance can be obtained empirically by starting with the lubricant control valve and injector throat opened wide and monitoring performance as their openings are systematically reduced. Often it is convenient to make these tests with a length of conduit that is much shorter than the one to be finally used, because less Bingham solid is required to make tests with a shorter conduit.

Because one surface of the lubricating film is attached to the wall of the conduit while the other is attached to the Bingham solid, the average linear velocity at which the lubricating film flows along the conduit is about half the linear velocity of the Bingham solid that it lubricates. Erosion of the Bingham solid near the point of lubricant injection and resulting loss of lubricity of the film can be minimized by forming the lubricating film with a flow field that automatically has such a velocity profile. This can be done by operating so as to form an annular vortex AV in the lubricant at the exit of annular passageway 15, as is shown in FIG. 1A. The vortex is driven by the motion of the column of Bingham solid, its rate of rotation always being such as to match the velocities of the two most adjacent streamlines (B=L) in the Bingham solid and lubricant. The formation of this vortex is ensured by providing (1) an axial orientation for exit portion 17 of annular passageway 15, (2) a blunt or flat end surface 3 adjacent terminal stepdown portion 5 that acts as a septum between the two flows before they come into contact, and (3) a flow rate of lubricant through throat portion 16 that is no greater than half the flow velocity of the Bingham solid. This upper limit for the desired flow rate of lubricant is equivalent to the condition that:

$$F_1 \leq 2 \frac{W}{D} F_2$$

where:
- $F_1$ = volumetric flow rate of the lubricant
- $F_2$ = volumetric flow rate of the Bingham solid
- $W$ = width of the annular throat
- $D$ = inside diameter of the conduit.

This relationship also defines a lower limit for the preferred width of the throat of the annular passageway for a given set of flow rates:

$$W \geq \frac{D}{2} \frac{F_1}{F_2}$$

At the same time, a necessary condition for obtaining a circumferentially uniform film of lubricant is that the pressure drop through the throat of the annular passageway be sufficient to provide a circumferentially uniform layer of lubricant in spite of factors tending to make it nonuniform such as the position of the lubricant feed line on one side of the injector, perturbations in the profile of flow velocity of the column of Bingham solid, and buoyant forces resulting from differences in density between the lubricant and the Bingham solid. The presence of a sufficient pressure drop requires that there be a preferred upper limit to the width of the throat of the annular passageway.

Between the upper and lower limits of throat width is a range of widths that give optimum or nearly optimum performance, provided that the flow rate of lubricant into the injector is just sufficient to provide the necessary lubrication, larger rates of flow resulting in an unnecessary dilution of the final mass of Bingham solid with lubricant. Therefore the several variables of interest are: the volumetric pumping rate $F_1$ for the lubricant; the opening $A_v$ through the lubricant control valve; the opening $A_t$ of the annular throat in the lubricant injector; the volumetric flow rate $F_2$ of the Bingham solid in the conduit; and the pressure drop $P_2$ of the Bingham solid in the conduit.

Desirable operating conditions depend somewhat upon circumstances, and are those that result in an acceptably high value for $F_2$ or an acceptably low value for $P_2$, together with an acceptably low value for $F_1/F_2$ so as to minimize admixture of the delivered product with lubricant. This requires a compromise since $F_2$ tends to increase and $P_2$ tends to decrease with increasing values of $F_1/F_2$. Settings for $A_t$ and $F_1 = F_1(A_v)$ can generally be found by either trial and error or systematic experimentation that gives an acceptable compromise for these aspects of performance.

When the apparatus of this invention is used for moving a Bingham solid through a long conduit, the required pumping pressure is reduced, and/or the flow rate of the solid is increased. According to the present invention, the resistance to movement of the Bingham solid through a conduit at least 300 diameters long (the diameter being the minimum diameter for conduits of nonuniform or noncircular cross-section) is reduced by provision of an annular layer of a liquid of low viscosity, e.g., water, around a central column of Bingham solid in the conduit. In particular, resistance is reduced to a level that permits Bingham solid to slide downward in plug flow in a descending section of conduit under the propelling force of gravity alone.

An important application of the invention is in moving aqueous explosive compositions of the water-gel or water-in-oil emulsion types, formulated to be Bingham solids, through a long conduit that is a pipe or hose, and particularly in such conduits having a descending section. In such an application the conduit would extend from a fixed mixer or tank to a package that is to be filled with explosive or to a mobile tank, or from a mobile tank or mixer to the bottom of a drill hole in a geological formation in which one or more explosive charges are to be detonated.

The drill hole may be, for example, up to a few tens of meters deep in an excavating, mining, quarrying, or seismic prospecting operation; or up to a few hundreds of meters deep such as in an in situ mining operation wherein deep ore is to be first blasted and then leached in place, or such as a water well that is to be explosively stimulated; or it may be an oil, gas, or geothermal well a few thousands of meters deep which is to be explosively stimulated.

The collar of the hole may be on the surface of the ground, or in an underground mine working, or under water of a depth ranging from that of a marsh to that of an ocean.

The mobile tank or mixer is generally on a vehicle (e.g., a tank truck, trailer, marsh buggy, barge, ship, or submersible vehicle) brought as near to the desired location of the explosive charge as is convenient.

Flow of the Bingham solid into the conduit is preferably powered either by introducing a gas or liquid into the tank under pressure to force the Bingham solid into the conduit, or by a pump between the tank and the inlet of the conduit. Downward flow of the Bingham solid through the most steeply descending portions of the conduit is powered by the force of gravity on the Bingham solid, but may be further increased by the pressure or pumping used to force the Bingham solid into the conduit.

In the present method, an adjustable lubricant injector of special design is employed to form a thin, uniform film of the lubricating liquid between the inner wall of the conduit and the central column of Bingham solid in the conduit, without appreciable intermixing of the lubricating liquid and the Bingham solid. The thickness of the thin, sharply defined film is adjusted to be approximately the minimum value required to allow the column of Bingham solid to move reliably at an acceptable rate (typically 170 liters per minute in a conduit having an internal diameter of 50 mm) either (1) in a vertical or steeply inclined section of the conduit propelled by gravity alone, or (2) in the entire conduit propelled by a pumping pressure no greater than the lesser of the maximum available pumping pressure at this pumping rate or the bursting pressure of the hose, or (3) after pumping has been stopped for a period of time and then restarted.

Generally the thickness of the lubricating film is adjusted to meet criterion (1) above when most of the conduit hangs at a nearly vertical or steeply inclined angle in a deep hole or in the ocean, or is adjusted to meet criterion (2) above when most of the conduit lies horizontally or nearly horizontally, or is adjusted to meet criterion (3) above when the Bingham solid tends to absorb an appreciable fraction of the lubricating film over an anticipated residence time of Bingham solid in the conduit.

The lubricating liquid should have a relatively low viscosity and should not rapidly attack the structure of the Bingham solid, but nevertheless need not be immiscible with it. Thus, at temperatures above 0° C., water can be a suitable lubricating liquid for both water gel explosives and water-in-oil type emulsion explosives that are Bingham solids with a sufficiently high yield strength. On the other hand, diesel fuel can be a suitable lubricant for water gel explosives but is generally unsuitable for use with water-in-oil type emulsion explosives because it rapidly attacks their structure and, as this occurs, the lubricating film can change rapidly in thickness and viscosity.

When water is used as a lubricating liquid, additives such as ethylene glycol or urea may be added to it to reduce its freezing point during cold weather, or to reduce its vapor pressure (and thereby its tendency to be absorbed by osmosis) if an appreciable amount of the lubricating film is being absorbed into the Bingham solid by osmosis occurring during its residence time in the conduit. The water need not be of high purity or even potable. Therefore any naturally occurring water available at the field site of use can generally be used even though such waters, whether from streams, wells, or the sea, invariably contain some dissolved salts, as expressed by the presence in them of ions such as sodium, magnesium, iron, chloride, sulfate, and bicarbonate. Additives that can act as friction reducers can be added to the water, such as a soap (e.g., sodium stearate or sodium palmitate if the available waters are sufficiently soft) or a water-soluble polymer (e.g., a polymer or copolymer of acrylamide and acrylic acid, or a polysaccharide, a mucosaccharide, a polyvinyl alcohol, or a polyethylene oxide).

The yield stress for the Bingham solid should be sufficiently low to permit an acceptable pumping rate, but sufficiently high to inhibit mixing with the lubricant, yield stresses in the range 1–3 kPa generally being satisfactory.

The following examples illustrate various modes of use of the lubricant injector of the invention.

EXAMPLE 1

The conduit 26 (FIG. 2) was 61 meters of 51-mm hose, the first 30.5 meters of this being coiled on a hose reel with the axis of the reel horizontal, and the remaining 30.5 meters being laid out horizontally on the ground.

The Bingham solid used was an aqueous explosive of the water-in-oil emulsion type and had a yield strength of 2 kPa and a density of 1.32 g/cm$^3$.

The lubricant was water.

The width of the annular throat portion 16 of the lubricant injector was set by first closing it completely and then backing off $\frac{1}{3}$ turn on the threads (12), which had 4.53 threads per centimeter. The throat was inclined 20° to the axis of the threads, so its width was:

[$\frac{1}{3}$ turn×(4.53 threads per cm)$^{-1}$] sin 20° =0.25 mm
and its cross-sectional area was: 0.025 cm×5.08 cm×$\pi$=0.41 cm$^2$.

The lubricant flow rate $F_1$ was maintained at 0.38–0.76 liter per minute, while the Bingham solid was pumped through the injector and conduit at a rate of 172 liters per minute. Thus, the flow rate of the lubricant was 0.17–0.34% that of the explosive, on a weight basis. Under these conditions, the above criterion for the width of the throat $$\left( W \geq \frac{D}{2} \cdot \frac{F_1}{F_2} = \frac{51}{2} \times \frac{0.76}{172} = 0.112 \text{ mm} \right)$$

was satisfied. The resulting pressure drop over the length of the conduit was about 520 kPa, or 8.6 kPa per meter of conduit. This is substantially less than the 12.9 kPa/m for the pressure generated by gravity alone acting on a column of this Bingham solid in a vertical section of the conduit. Consequently, under these operating conditions, the column of Bingham solid is able to move down through a long vertical length of tube under the force of gravity alone. When pump 27 was turned off and the hose 26 was lifted at a point upstream from its outlet, the column of Bingham solid continued to slide from the lowered end of the hose under the influence of gravity alone, illustrating this mode of flow.

The described equipment, without the hose reel, with the settings of Example 1, was used to load 11800 kg of the explosive of Example 1 into 40 boreholes in an open-pit coal mine, preparatory to blasting the overburden penetrated by the boreholes.

The following example describes the placement of a water-bearing explosive in bulk form in a deep gas well by gravity flow by the use of the lubricant injector of the invention.

EXAMPLE 2

The conduit described in Example 1 is lengthened so that it extends from the surface of the ground to the bottom of a gas well 1220 m deep that is to be explosively stimulated. This is done by connecting the downstream end of the hose 26 to the top of a 1220 m length of 51 mm steel pipe hung from the collar of the well and reaching almost to its bottom.

Seventy-five liters of 20% ethylene glycol/80% water is run into conduit 26 to wet its walls. The annular throat portion 16 of the lubricant injector is then set to a width of 0.25 mm, and a lubricant composed of 20% ethylene glycol/80% water is injected into it through the annular throat portion at a rate of 0.76 liter per minute.

An aqueous explosive of the water gel type formulated with crosslinked guar gum to be a Bingham solid with a yield strength of 3 kPa and a density of 1.5 g/cm$^3$ is then pumped through the injector and conduit at an average rate of 172 liters per minute, while raising the pipe to accommodate the rising level of the explosive charge delivered to the bottom of the well. The lubricated column of explosive slides down the 1220 m vertical section of the conduit by the action of gravity alone. Pumping of explosive is momentarily stopped whenever it is necessary to uncouple the hose from the pipe, remove a section of pipe, and recouple the hose to the resulting shortened length of pipe.

After 8630 kg of the planned 9080 kg charge has been delivered down the pipe, the hose is uncoupled and a time bomb is inserted into the top of the pipe. The hose is then reconnected to the top of the pipe and the remaining 450 kg of explosive are delivered to the top of the charge in the well, on top of the time bomb.

The pipe is then removed from the well, 30.5 meters of the well above the charge is filled with gravel, and the area around the wellhead is cleared until the time bomb detonates the charge.

EXAMPLE 3

A copper/silver/gold ore body below the floor of the ocean is to be fragmented with explosives before leaching it in place.

The conduit described in Example 1 is lengthened so that it extends from the deck of a floating platform to the bottom of the ocean in water 1830 m deep. This is done by first stabilizing the position of the platform with respect to the floor of the ocean by means of anchor cables, and then connecting the downstream end of hose 26 to the top of a 3050 m length of 51 mm steel pipe extending in the form of a catenary from the deck of the platform to the floor of the ocean, where it terminates above the ore body in a swivelled 90° elbow and a 61 m length of flexible hose. By remote means, this hose is inserted into boreholes drilled from the floor of the ocean into the ore body. The width of the annular throat portion 16 in the lubricant injector is then set at 0.25 mm. The explosive described in Example 2 and time bombs are then loaded into these holes, one hole at a time, through the lubricant injector and conduit, using seawater as a lubricant at the rate of 0.13 liter of seawater per 45.4 kg of explosive. The hose is then withdrawn from the hole. The holes in the water-flooded ore body are thereby detonated one hole at a time to fragment the ore and make it permeable in accordance with U.S. Pat. No. 3,902,422, preparatory to leaching it in place.

I claim:

1. Apparatus for aiding in the transfer of a Bingham solid by lubricated plug flow through a conduit comprising:
   (a) a first cylinder open at both ends and having a substantially uniform internal diameter;
   (b) a second cylinder open at both ends and having a substantially uniform internal diameter less than the internal diameter of said first cylinder, the outer surface of said second cylinder being stepped down at one end in a manner such that (1) an initial stepdown portion has a diameter which is less than the outer diameter, and greater than the internal diameter, of said first cylinder, and (2) a terminal stepdown portion, adjacent a blunt end surface of said second cylinder, has a diameter which is substantially uniform and less than the internal diameter of said first cylinder; and
   (c) a third cylinder open at both ends and fitted over, and in fluid-tight, axially rigid, coupling engagement with, overlapping ends of said first and second cylinders, said first and second cylinders being positioned coaxially with respect to one another in a manner such that said blunt end surface adjacent said terminal stepdown portion of the outer surface of said second cylinder is inside said first cylinder, thereby forming coaxial, communicating, first and second cylindrical chambers delimited by the plane which passes through said blunt end surface, said initial stepdown portion of the outer surface of said second cylinder, the end surface of said first cylinder adjacent thereto, and a portion of the inside surface of said third cylinder together forming an annular chamber coaxial with said first and second cylindrical chambers, the relative displacement of said first and second cylinders along their common axis being adjustable at their coupling with said third cylinder, thereby allowing said annular chamber to be (1) closed to said cylindrical chambers whereby a portion of a surface between said initial and terminal stepdown portions of the outer surface of said second cylinder is in contact with a conforming portion of a facing surface at the end of said first cylinder, or (2) open as a result of the separation of said conforming surface portions, said separation forming an annular passageway connecting said annular chamber with said first cylindrical chamber, said annular passageway having a constricted throat portion and a wider exit portion that is coaxial with, and ends in said plane which delimits, said cylindrical chambers, the distal end of said second cylinder being adapted to connect with a source of Bingham solid, and the wall of said third cylinder containing a passageway from its outer surface to said annular chamber adapted to connect with a source of lubricating liquid, and the distal end of said first cylinder being adapted to connect with a conduit for receiving Bingham solid and lubricating liquid exiting from said first cylindrical chamber.

2. An apparatus of claim 1 wherein said third cylinder is coupled to said first and second cylinders by means of threads.

3. An apparatus of claim 2 wherein said second cylinder is rotatable on said threads so as to move said cylinder axially relative to said first cylinder whereby the size of said throat portion is adjusted.

4. An apparatus of claim 2 wherein leakage through said threads is prevented by one or more O-ring seals.

5. An apparatus of claim 1 wherein the outer surface of said second cylinder between said initial and terminal stepdown portions is slanted, and the conforming facing surface at the end of said first cylinder is a beveled inside edge surface thereof.

6. An apparatus of claim 1 wherein said passageway in the wall of said third cylinder is formed by the bore of a tube in engagement with said third cylinder in an aperture which penetrates through the wall thereof adjacent said annular chamber whereby said bore is in communication with said annular chamber.

7. An apparatus of claim 2 wherein said cylinders are made of stainless steel.

* * * * *